July 17, 1956　　　R. H. ABBOTT ET AL　　　2,755,150

BEARING FOR VERTICAL ROTARY SHAFT

Filed June 10, 1953

INVENTORS.
Robert H. Abbott
George M. Meisel
BY

ATTORNEY

United States Patent Office

2,755,150
Patented July 17, 1956

2,755,150
BEARING FOR VERTICAL ROTARY SHAFT

Robert H. Abbott and George M. Meisel, Denver, Colo., assignors to Colorado Iron Works Company, a corporation of Maine Application June 10, 1953, Serial No. 360,726

4 Claims. (Cl. 308—231)

This invention relates to bearings and more particularly to bearings for vertical rotating shafts.

One object of the present invention is to provide a bearing capable of carrying the large thrust and radial loads which are inherent in heavy vertical rotating shafts.

A further object of the present invention is to provide an end bearing for a vertical shaft which is easily and quickly replaceable.

Another object of the present invention is to provide a bearing for a vertical, rotating shaft which will provide positive alignment of the shaft under all operating conditions.

These and other objects and advantages will be readily apparent by referring to the following description and claims.

Figure 1:
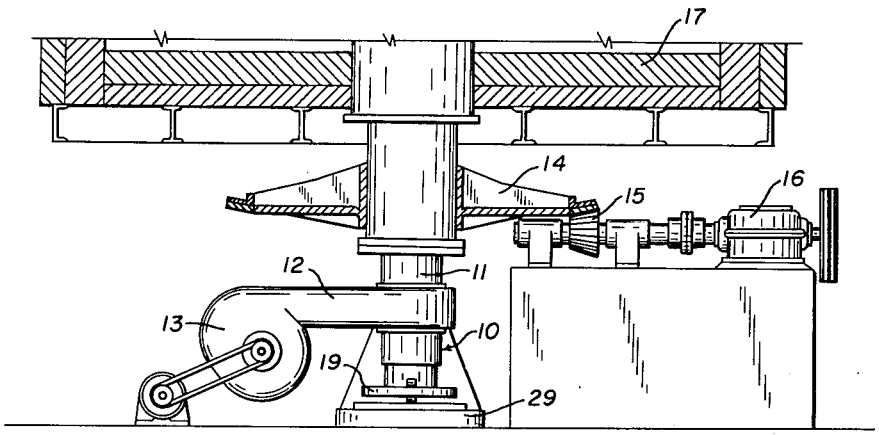
Figure 2:
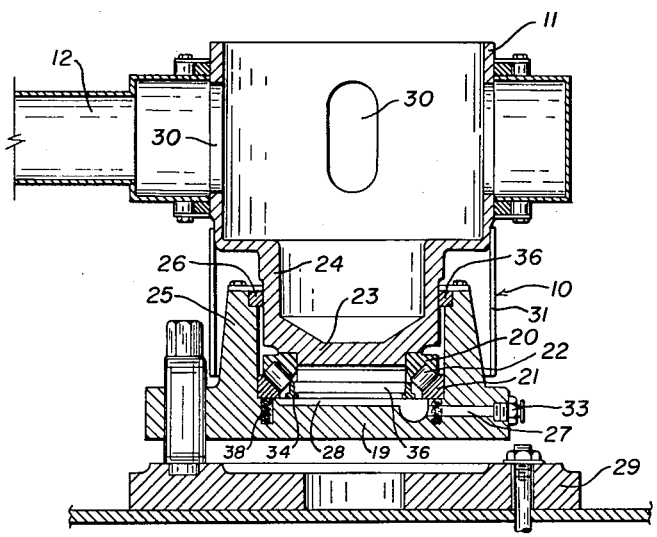

The present invention provides a new and novel bearing for supporting a vertical, rotating shaft. The bearing is widely applicable for supporting, in correct alignment, rotating, vertical shafts. The bearing of the invention is particularly useful for supporting vertical shafts which are operated under varying load conditions. In one preferred application of the invention, the device provides bearing support for vertical, rotating ore roasting ovens. In this application, the bearing uniquely provides means for carrying the thrust and radial loads of the ovens, and also provides means for cooling the friction surfaces. Further, the invention provides substantially dust-free operation of the bearing surfaces, under the extreme dust and dirt conditions found around ore processing mills. The combination of dust and heat has, heretofore, greatly increased the cost of maintenance of such roasting ovens due to frequent bearing replacements. The present invention reduces such maintenance to a minimum. In more specific detail, the invention is illustrated in the description and drawings, in which:

Figure 1 is a partial elevation of a device showing arrangement of a rotating, vertical shaft in relation to one embodiment of the present invention; and Fig. 2 is a cross-sectional elevation of the bearing shown in Fig. 1.

In the device selected for illustration, the bearing is utilized to carry the radial and thrust loads of the shaft of a vertical, rotating ore roasting oven. The bearing, shown generally by numeral 10, is associated with lower end of a vertical shaft 11, as shown in Fig. 1. The bearing 10 is interconnected with a base plate 29 which supports the shaft 11. The shaft 11 is hollow to permit cooling air to be circulated therethrough, as by a blower 13 with an inlet duct 12 connected to the hollow shaft. The shaft is rotated by known means, as by drive 16, bevelled pinion 15 and bevelled gear 14. Above the driving means, the shaft extends into the oven proper 17.

The detailed construction of the embodiment shown in Fig. 2, utilizes a hollow shaft 11 having an end wall 23 closing the lower end of the shaft. The end wall 23 has a smaller diameter than the shaft 11, and a step 24 interconnects the two. A pair of juxtaposed bearing surfaces and a spherical roller bearing 22 provide the bearing means for the rotating shaft. The upper, rotating, bearing surface or race 20 is interconnected with end wall 23 so that the thrust load of the shaft 11 bears directly on the surface 20 intermediate the ends thereof. The lower, stationary, bearing surface or race 21 is seated in the bearing housing 19. A plurality of spherical rollers 22 interspaces the two races. The placement of the rollers 22 in relation to the shaft, and the angular disposition of the rollers alleviates the need of both a thrust bearing and a radial bearing. The bearing 10 effectively carries the thrust and radial loads of the shaft, and automatically centers the revolving shaft. This is unique and unexpected, since the loads in ore roasting ovens vary suddenly and frequently.

Lubrication for the bearing may be supplied by means of a passage 27, externally terminating through a one-way valve 33, interconnected with a passageway 28. A short annular passage 34, between a retaining ring 35 and stationary race 21, provides a lubricant passage to the rollers.

The bearing is enclosed by an annular wall 25 of the bearing housing 19. The wall is sealed to the rotating shaft 11 by annular gasket 36. The rollers are therefore completely sealed, and as an added precaution in areas of extreme dust conditions, a sleeve 31 is placed around the shaft and over the bearing housing as a dust protector.

When used in conjunction with an ore roasting furnace, air is blown through duct 12, through the shaft openings 30, and through the hollow shaft. The air keeps the rollers substantially cooler than the high temperatures of the oven. Further, the bearing unit being small is easily handled for maintenance and repair. It is, also, readily accessible for a complete change.

In applications where built up hearth beds tend toward an unbalanced shaft, a plurality of compression springs 38 keeps the stationary race 21 against the rollers. The springs 38 are seated in a series of holes in the bearing housing 19 directly beneath the stationary race 21. The springs are so spaced as to provide a substantially uniform axial load on the race against the rollers. An unbalanced, listing shaft tends to climb the stationary race making the list and the unbalanced condition more pronounced, and subsequently causing injury to the bearing. The springs, however, squarely force the race against the rollers preventing the climbing and subsequent damage to the rollers.

In compliance with existing statutes, the invention has been illustrated in detail by specific examples, but there is no intent to limit the invention to the precise details so disclosed except in so far as defined by the appended claims.

We claim:

1. A mounting arrangement for a vertical roasting oven comprising, in combination, a hollow, vertically disposed shaft arranged to support a rotary oven thereon, said shaft inclusive of an upper heat exchange zone having cooling gas inlet and discharge means, said shaft terminating in a hollow co-axial portion of lesser diameter arranged in open communication with said hollow shaft, means for circulating cooling gas into said upper zone so as to induce a heat exchange action throughout said lower zone to cool the same, a bearing assembly including a stationary base juxtaposed with the lower end of said shaft, an upper bearing race interconnected with said shaft and having a surface arranged at an inclination to the axis of said shaft, a lower race mounted for yielding movement in said base, said lower race having a bearing surface positioned at an inclination to the shaft and in substantially non-parallel relation to said upper bearing surface, a plurality of spherical rollers disposed between said surfaces and arranged to permit relative motion between said bearing surfaces, spring means mounted below and normally urging said lower bearing race toward said upper race so as to maintain alignment of said bearings therebetween, a dust shield supported from said shaft encompassing said bearing assembly and spaced from said base at its lower end and forming with said assembly an annular air space of substantial width so as to form a dead air space for insulating said bearing from external heat, closure means for said bearings internal of said dust shield and arranged to totally enclose said bearings to prevent entrance of dust, and lubrication means for maintaining lubrication in said bearing assembly.

2. A mounting arrangement for a vertical roasting oven comprising in combination a hollow, vertically disposed shaft arranged to support a rotary oven thereon, said shaft inclusive of an upper heat exchange zone having cooling gas inlet and discharge means, said shaft terminating in an outwardly extending, hollow co-axial portion of lesser diameter arranged in open communication with said hollow shaft, means for circulating cooling gas into said upper zone so as to induce a heat exchange action throughout said lower zone to cool the same, a bearing assembly including a stationary base having an upstanding wall juxtaposed with the lower end of said shaft, an upper bearing race interconnected with said shaft and having a surface arranged at an inclination to the axis of said shaft, a lower race having a lower bearing surface mounted for yielding movement in said base, said lower race having a bearing surface at an inclination to the shaft and in substantially non-parallel position to said upper bearing surface, a plurality of spherical rollers disposed between said surfaces and arranged to permit relative motion between said bearing surfaces, a plurality of coil springs mounted in upright position below and normally urging said lower bearing race toward said upper race so as to maintain alignment of said bearings therebetween, a tubular dust shield supported from said shaft encompassing said bearing assembly and spaced from said base at its lower end and forming with said assembly an annular air space of substantial width so as to form a dead air space for insulating said bearing from external heat, closure means rotatably mounted between said coaxial portion and said upstanding wall so as to totally enclose said bearings and to prevent entrance of dust, and lubrication means for maintaining lubrication in said bearing assembly.

3. A supporting assembly for a vertical, rotary shaft which comprises in combination with the end of such shaft having a co-axial portion of lesser diameter than said shaft, an upper bearing race interconnected with said portion having a bearing surface disposed at an inclination to said shaft, a stationary base having an upstanding wall telescoped with said portion, a lower bearing race mounted for yielding movement in said base spaced apart from said upper race, said lower race having a bearing surface disposed at an inclination to said shaft and in substantial non-parallel relation to said upper bearing surface, a plurality of spherical rollers disposed between said surfaces and arranged to permit relative rotation between said bearing surfaces, and spring means mounted below and normally urging said lower bearing race toward said upper race so as to maintain alignment of said bearings therebetween.

4. A supporting assembly for a vertical, rotary shaft which comprises in combination with the end of such shaft having an extending co-axial portion of lesser diameter than said shaft, an upper bearing race interconnected with said portion having a bearing surface disposed at an inclination to said shaft, a stationary base having an upstanding wall telescoped over said portion, a lower bearing race mounted for yielding movement in said base spaced apart from said upper race, said lower race having a bearing surface disposed at an inclination to said shaft and in substantial non-parallel relation to said upper bearing surface, a plurality of spherical rollers disposed between said surfaces and arranged to permit relative rotation between said bearing surfaces, and a plurality of coil springs mounted in vertical position below and normally urging said lower bearing race toward said upper race so as to maintain alignment of said bearings therebetween.

References Cited in the file of this patent

UNITED STATES PATENTS

| 465,009 | Weatherson et al. | Dec. 15, 1891 |
| 529,853 | Burdick | Nov. 27, 1894 |
| 2,173,489 | Voigt | Sept. 19, 1939 |
| 2,284,446 | Powers | May 26, 1942 |
| 2,325,623 | Murtagh et al. | Aug. 3, 1943 |
| 2,395,097 | Buck et al. | Feb. 19, 1946 |
| 2,410,340 | Cronstedt | Oct. 29, 1946 |

FOREIGN PATENTS

| 896,684 | France | Feb. 28, 1945 |